US006958828B2

(12) United States Patent
Knox et al.

(10) Patent No.: US 6,958,828 B2
(45) Date of Patent: Oct. 25, 2005

(54) METHOD AND APPARATUS FOR DETECTING PHOTOCOPIER TRACKING SIGNATURES

(75) Inventors: Keith T. Knox, Rochester, NY (US); Zhigang Fan, Webster, NY (US); Eric J. Schneider, Webster, NY (US)

(73) Assignee: Xerox Corporation, Stamford, CT (US)

( * ) Notice: Subject to any disclaimer, the term of this patent is extended or adjusted under 35 U.S.C. 154(b) by 343 days.

(21) Appl. No.: 10/280,311

(22) Filed: Oct. 24, 2002

(65) Prior Publication Data

US 2003/0058467 A1   Mar. 27, 2003

Related U.S. Application Data

(63) Continuation of application No. 09/216,236, filed on Dec. 18, 1998, now Pat. No. 6,515,764.

(51) Int. Cl.[7] .......................... G06F 15/00; G06F 9/00; H04N 1/46; G03F 3/08
(52) U.S. Cl. ....................... 358/1.9; 358/518; 358/515; 382/167
(58) Field of Search ............................... 358/1–9, 515, 358/518, 520, 512, 513, 504, 522, 535; 382/162, 382/167

(56) References Cited

U.S. PATENT DOCUMENTS

| | | | | |
|---|---|---|---|---|
| 4,336,994 A | * | 6/1982 | Banton ........................... 399/1 |
| 5,282,269 A | * | 1/1994 | Willems et al. .............. 345/545 |
| 5,283,658 A | * | 2/1994 | Hayashi et al. .............. 358/296 |
| 5,361,134 A | * | 11/1994 | Hu et al. ...................... 358/296 |
| 5,497,180 A | * | 3/1996 | Kawakami et al. .......... 347/131 |

(Continued)

FOREIGN PATENT DOCUMENTS

| | | | |
|---|---|---|---|
| JP | 355135192 A | * | 10/1980 |
| JP | 358082147 A | * | 5/1983 |
| JP | 359204009 A | * | 11/1984 |
| JP | 360153865 A | * | 6/1985 |
| JP | 361219257 A | * | 9/1986 |
| JP | 409037273 A | * | 2/1997 |

OTHER PUBLICATIONS

"Imaging the Dead Sea Scrolls", Keith Knox et al., Optics & Photonics News, Aug., 1997, vol. 8, No. 8.

Primary Examiner—Madeleine Nguyen
(74) Attorney, Agent, or Firm—Mark Z. Dudley

(57) ABSTRACT

A method and apparatus are described for detecting photocopier tracking signatures placed on documents produced by color photocopiers. The apparatus includes an input terminal that supplies digital image data representing an input document produced by a color photocopier. The digital image data includes a plurality of pixel values grouped together to form a plurality of color separations that represent the input document. The apparatus also includes an image processing unit that generates an output image based on the digital image data. The image processing unit generates the output image based on differences between corresponding pixel values of at least two of the plurality of color separations. The apparatus further includes an ouput terminal for displaying the output image to view the photocopier tracking signature. Color differences can be detected by combining two or more of the color separations into a resulting monochromatic image and then enhancing the resulting color differences. The combination of the separations exposes small color differences that are not detectable in any of the individual separations, thus enabling the photocopier signature to be detected.

28 Claims, 2 Drawing Sheets

U.S. PATENT DOCUMENTS

| | | |
|---|---|---|
| 5,510,199 A | 4/1996 | Martin |
| 5,515,451 A | 5/1996 | Tsuji et al. |
| 5,721,788 A * | 2/1998 | Powell et al. ............... 382/100 |
| 5,734,752 A * | 3/1998 | Knox ......................... 358/3.28 |
| 5,856,876 A * | 1/1999 | Sasanuma et al. .......... 358/300 |
| 5,880,771 A * | 3/1999 | Sutton ......................... 348/31 |
| 5,983,045 A * | 11/1999 | Suzuki et al. ................. 399/51 |
| 6,040,131 A * | 3/2000 | Eshelman et al. .......... 430/619 |
| 6,633,333 B1 * | 10/2003 | Spencer ...................... 348/272 |
| 6,686,136 B1 * | 2/2004 | Sowinski et al. ........... 430/505 |

* cited by examiner

METHOD AND APPARATUS FOR DETECTING PHOTOCOPIER TRACKING SIGNATURES

CROSS-REFERENCE TO RELATED APPLICATIONS

This is a continuation of application Ser. No. 09/216,236 filed Dec. 18, 1998 now U.S. Pat. No. 6,515,764.

BACKGROUND OF THE INVENTION

The present invention relates to the color image processing arts. It finds particular application in conjunction with detecting photocopier tracking signatures placed on documents that are reproduced by color photocopiers, and will be described with particular reference thereto. However, it should be appreciated that the present invention may also find application in conjunction with other types of imaging systems and applications where detecting hidden information in an image or document is desirable.

Photocopier technology, in particular color photocopier technology, has advanced to the point that highly accurate copies of an original color document can be produced. Such accurate color document reproduction capabilities have brought about the potential for illicit photocopying of valuable color documents such as currency, stock and bond certificates, bank notes, and other negotiable instruments, etc.

Various methods have been developed to make such valuable documents resistant to photocopying. Some known methods involve the use of a special ink composition; a particular printed pattern; minute gradations in the thickness of the printed image; or some combination of these methods, all of which result in making the document either wholly or partially resistant to photocopying. One such solution is disclosed in U.S. Pat. No. 5,510,199, which describes a method of making a photocopy-resistant document.

Other known solutions focus on providing photocopiers with document rejection capabilities. Typically, these solutions prevent a color copier from reproducing an original document when the copier detects one or more specific landmarks or features on the original document. One such solution is disclosed in U.S. Pat. No. 5,515,451, which describes an image processing system for selectively reproducing documents.

Notwithstanding these known countermeasures, valuable color documents can sometimes be photocopied with enough accuracy to somewhat appear as an original document. Thus, known color photocopiers are provided with a further countermeasure that prints substantially-latent, photocopier-specific information on each output document that is produced. One such color photocopier signature tracking system is discussed in the above-mentioned U.S. Pat. No. 5,515,451.

For example, copier-specific information, in the from of a repeating yellow dot pattern having areas and/or densities that are below the threshold of visual perception, is printed on every output document generated by the photocopier. The use of yellow toner for the dot pattern is preferred because most people are not able to visually detect yellow as well as other colors. Photocopier-specific information can include the photocopier manufacturer, photocopier serial number, photocopier model number, etc. This alphanumeric information can be converted to numeric code, and the numeric code can then be represented as a pattern of dots that are repeated across an output document. For example, Xerox Corporation can be assigned a manufacturer's code of $50_{10}$, which can be represented as $00110010_2$. The binary 1's can be represented as the yellow dots and binary 0's can be represented a spaces.

FIGS. 1 and 2 show an exemplary output document 10 on which a copied image 12 and latent copier-specific information are printed. The copier-specific information is in the form of repeating blocks of code data 14 that are arrayed across the output document. In this example, one byte of code data forms a single row 16 of the block, and each dot position 18 in the row represents a single bit of a code data byte. The dot pattern for each bit can consist of two yellow pixels in the fast scan direction and one yellow pixel in the slow scan direction. This extremely small yellow dot pattern is below the threshold of visual perception for most people.

Latent copier-specific information can sometimes be detected by viewing the counterfeit document through a blue filter and a magnifier. This maximizes the contrast of the photocopier-signature if the filter is chosen to be the complement of the colored dot pattern. When such a dot pattern is detected, the photocopier-specific information can be decoded and then used by law enforcement agencies to track down counterfeiting perpetrators. However, in the case where the copied image 12 and/or the plain document substrate 10 has a yellow color component, it can be very difficult to detect the yellow dot pattern with conventional methods. That is, this known method of detecting copier-specific information works as long as the background information does not significantly lower the visual contrast of the photocopier signature.

Accordingly, it has been considered desirable to develop a new and improved method and apparatus for detecting photocopier tracking signatures placed on documents produced by color photocopiers, which meets the above-stated needs and overcomes the foregoing difficulties and others while providing better and more advantageous results.

SUMMARY OF THE INVENTION

In accordance with one aspect of the present invention, a method of detecting a latent photocopier tracking signature printed on a document produced by a color photocopier. The method includes generating a plurality of color separations that digitally represent the document wherein each of the plurality of color separations are defined by a plurality of pixel values; generating an output image based on differences between corresponding pixel values of at least two of the plurality of color separations; and displaying the output image to view the photocopier tracking signature.

In accordance with another aspect of the present invention, an image processing system is disclosed. The image processing system includes an input terminal that supplies digital image data representing an input document produced by a color photocopier. The digital image data includes a plurality of pixel values grouped together to form a plurality of color separations that represent the input document, and the input document has a latent photocopier tracking signature printed thereon. The system also includes an image processing unit that generates an output image based on the digital image data, the image processing unit generating the output image based on differences between corresponding pixel values of at least two of the plurality of color separations. The system further includes an output terminal for displaying the output image to view the photocopier tracking signature.

One advantage of the present invention is the provision of a method for detecting copier tracking signatures printed on a photocopier-generated document.

Another advantage of the present invention is the provision of a method for detecting information printed on a photocopier-generated document that is below a threshold of visual perception.

A still further advantage of the present invention is the provision of a method for authenticating a photocopier-generated document.

Still further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

DETAILED DESCRIPTION OF THE PREFERRED EMBODIMENT(S)

Figure 1:
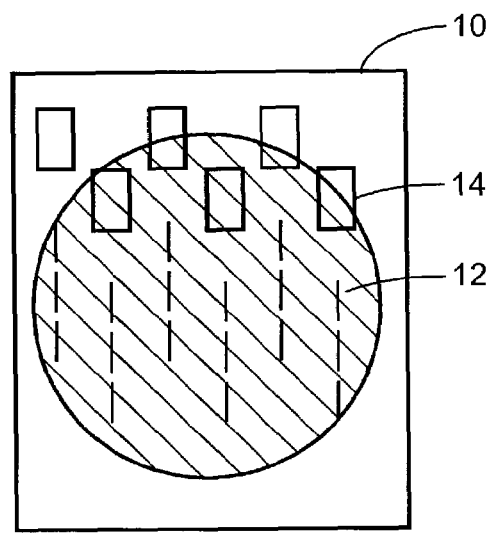
FIG. 1 illustrates a photocopier-generated document having a primary image and a repeating pattern of copier-specific information printed therein.
Figure 2:
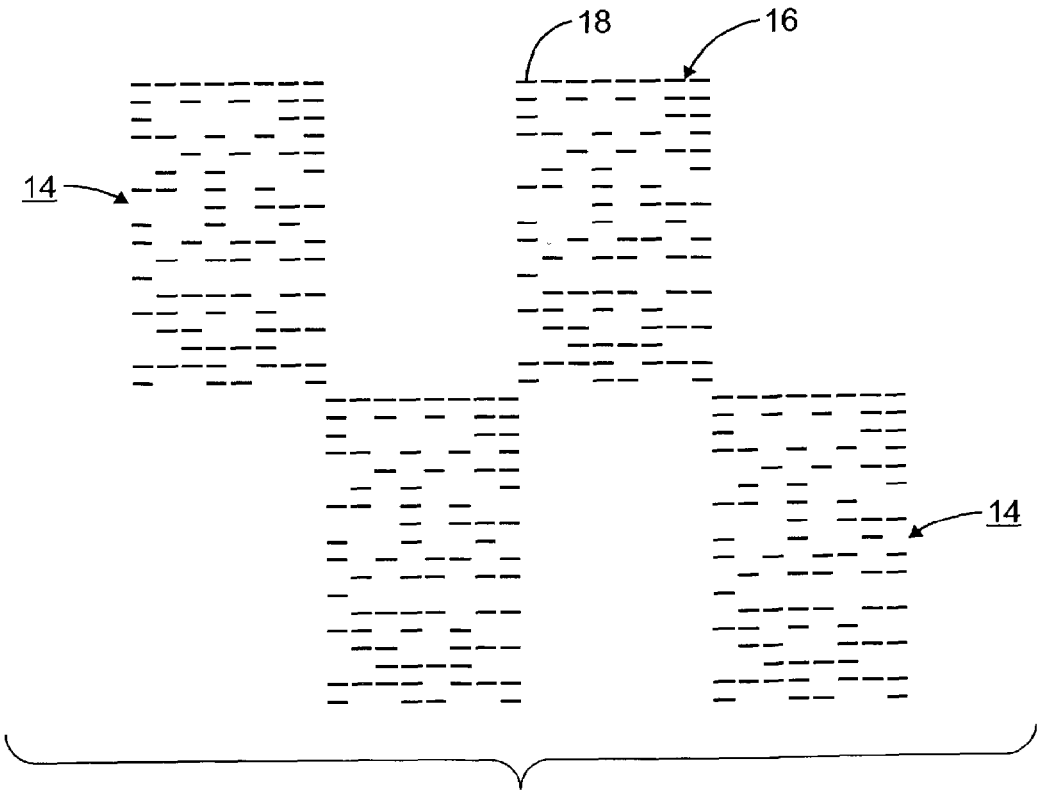
FIG. 2 is an enlarged view of the copier-specific information arranged in a repeating block pattern with one byte of information per row.

The following will be a detailed description of the drawings illustrated in the present invention. In this description, the terms "image data" or "pixels" in the form of video image signals, which may be either analog or digital voltage representations of an image, indicate a representation of an image provided from a suitable source. For example, the image signals may be obtained through line by line scanning of an image bearing the original by one or more photosensitive elements, such as an array of charge couple devices commonly referred to as CCDs. Line by line scanning of an image bearing the original for the duration of image data is well known and does not form a part of the present invention.

A computer workstation program in accordance with document creation application software or from a data storage device can also derive image data. In content, the original video image signals may be composed entirely of a single image component such as lines, text, low frequency halftones, high frequency halftones, contones, or any combination thereof.

Moreover, in describing the present invention, it is assumed that the video signal has a value in a range between 0 and 255. However, any range from the video signal can be utilized in conjunction with the present invention. Furthermore, in the following description, the term "gray level" will be used to describe both black and white and color applications.

Furthermore, in describing the present invention, the term "pixel" will be utilized. This term may refer to an electrical (or optical if fiber optics are used) signal which represents the physical measurable optical properties at a physical definable area on a receiving medium. The receiving medium can be any tangible document, photoreceptor, or marking material transfer medium.

Moreover, the term "pixel" may refer to an electrical (or optical) signal which represents the physically measurable optical properties at a physically definable area on the display medium. A plurality of the physically definable areas for both situations represent the physically measurable optical properties of an entire physical image to be rendered by either a material marking device, electrically or magnetic marking device, or optical display device.

Lastly, the term "pixel" in the scanning environment, may refer to an electrical (or optical) signal which represents physical optical property data generated from a signal photosensor cell when scanning a physical image so as to convert the physical optical properties of the physical image to an electronic or electrical representation. In other words, in this situation, a pixel is an electrical (or optical) representation of the physical optical properties of a physical image measured at a physical definable area on an optical sensor.

The term "pixel" in the rendering environment, may refer to an electrical (or optical) signal which represents the smallest physical area on a recording substrate that can be rendered. In other words, in this situation, a pixel is an electrical (or optical) representation of the physical spot created by a laser in a laser printed image or the physical spot created by the smallest rendered ink droplet.

Figure 3:
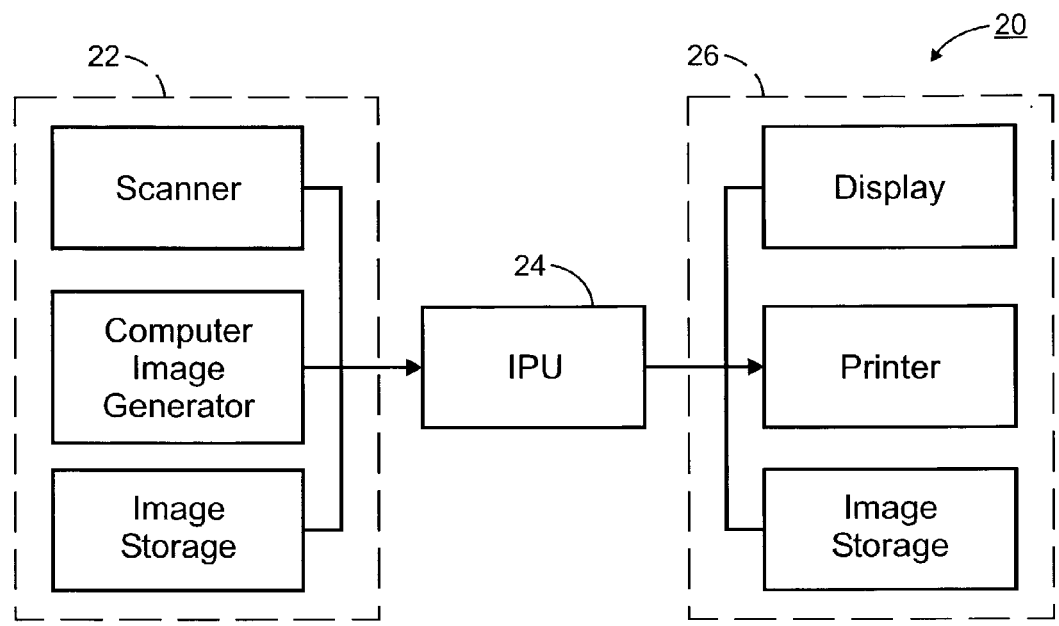
FIG. 3 is a simplified block diagram illustrating an exemplary color digital image processing system that can implement the method for detecting copier tracking signatures of the present invention.

With reference now to FIG. 3, an exemplary color digital image processing system 20 includes an image input terminal (IIT) 22 having one or more of a scanner, computer image generator, an image storage device, or the like. The image input terminal derives or delivers digital color image data in the form of two or more monochromatic separations, wherein the picture elements or "pixels" of each separation are defined at a continuous tone depth of x bits per pixel, where x is an integer value e.g., 8-bits.

These color image signals or video data are input to an image processing unit (IPU) 24 where digital color image processing in accordance with the present invention is performed. The image processing unit 24 outputs data in a suitable format to an image output terminal 26 having one or more of a printer, a visual display and an image storage device. Suitable apparatus for color digital image input and/or output include the Pixelcraft 7650 Pro Imager Scanner, XEROX DocuTech Production Printing System scanners, the XEROX 5775 digital color copier, the XEROX 5760 and 5765 Majestik digital color copiers, or any other suitable digital color scanner and/or copier.

A color photocopy (hereinafter "the input document"), such as a counterfeit copy of an original valuable document, having the above-described specific, latent information printed on the input document, the latent information typically being below a threshold of visual perception, such as a latent yellow dot pattern, can be scanned into the system 20 via the image input terminal (IIT) 22 in a conventional manner. However, it is contemplated that the input document can be sampled and digitized using a digital camera, frame grabber, or other digitizing device; or stored on a storage medium such as RAM, ROM, hard drive, magnetic tape, floppy disk, CD, DVD, etc.

When scanned, the input document can be sampled at any resolution such as 400 samples per inch (spi) or 600 spi and stored in image buffers or registers as a bitmapped red, green, and blue color separations using the RGB color model. Thus, the input document is digitally represented with three data bytes per pixel, where each byte represents the gray scale intensity of one of the primary color components (red, green, blue) of the color input image. This allows each pixel to span a range of gray-scale values from $0_{10}$ (black) to $255_{10}$ (white). However, the input document can be represented with any number of bits per sample, and the stored binary numbers can correspond to parameters other than gray scale intensity such as luminance, chrominance, etc. Regardless of pixel gray scale value, the location of each pixel in the individual red, green, and blue separation bitmaps is defined in terms of a row (m) and column (n).

With the primary color separations of the input document stored as described above, color differences can be detected by combining two or more of the color separations into a resulting monochromatic image and then enhancing the resulting color differences. The combination of the separations exposes small color differences that are not detectable in any of the individual separations, thus enabling the photocopier signature to be detected.

Figure 4:
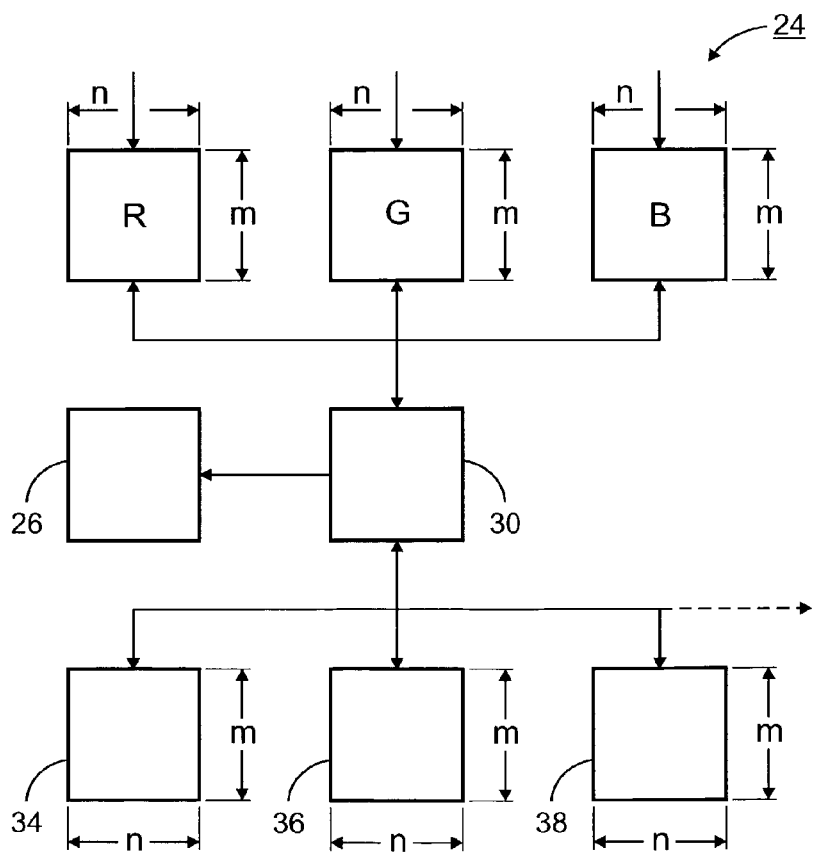
FIG. 4 is a simplified block diagram of an image processing unit (IPU) shown in FIG. 3.

In particular, with reference to FIG. 4, the image processing unit 24 includes a controller 30 that i) parses the RGB color separations on a pixel-by-pixel basis, ii) performs mathematical operations on the corresponding pixels of the color separations to generate at least one output image, and iii) enhances the output image before it reaches the image output terminal 26.

The controller generates at least one output image by calculating the differences between corresponding pixels of various combinations of the RGB color separations. In the embodiment being described, a first monochromatic output image 34 is generated by subtracting the video values of the green separation from the video values of the blue separation on a pixel-by-pixel basis. That is, the output image 34 is generated from:

$$D1_{m,n}=B_{m,n}-G_{m,n},$$

where $D1_{m,n}$ is the resulting video value of the nth pixel in the mth row of the output image 34, $B_{m,n}$ is the video value of the nth pixel in the mth row of the blue separation bitmap, and $G_{m,n}$ is the video value of the nth pixel in the mth row of the green separation bitmap.

The pixel values of the output image 34 can mathematically fall within a range of $-255_{10}$ to $+255_{10}$. However, because the pixel values of the output image 34 represent a difference between corresponding pixels of the color separations, the values of the pixels fall together within a much smaller range. As a result, the scale can be significantly expanded around the grouping of pixel values without losing a significant amount of information. Once way to keep the difference values within the same range as the individual separations is to simply discard the few pixels values that fall outside of the range of $-128_{10}$ to $127_{10}$ are simply discarded. Another way is to simply divide $D1_{m,n}$ by 2. With the first method, some pixel values are lost at the extremes of the dynamic range, and with the second method, dynamic range resolution is lost overall. However, either method works fine for this purpose.

Applying known histogram equalization and/or histogram stretching techniques to the output image enhances the contrast of the output image 34. In the embodiment being described, a simple histogram stretch of the minimum value to 0 and the maximum value to 255 provides satisfactory results. The image processing unit 24 then outputs the contrast-enhanced image to one or more of the printer, the visual display and/or the image storage device.

The dot patterns representing the photocopier-specific information may not be seen in the monochromatic output image 34, depending upon the color(s) of the dot patterns, the document substrate, and the photocopied image. Accordingly, it may be necessary to generate a second monochromatic output image 36 by combining the color separations in a manner different from that of the first output image 34. For instance, the second output image 36 can be generated by subtracting the pixel values of the red separation from the pixel values of the blue separation on a pixel-by-pixel basis. That is, the output image 36 is generated from:

$$D2_{m,n}=R_{m,n}-B_{m,n},$$

where $D2_{m,n}$ is the resulting video value of the nth pixel in the mth row of the output image 36, $R_{m,n}$ is the video value of the nth pixel in the mth row of the red separation bitmap, and $B_{m,n}$ is the video value of the nth pixel in the mth row of the blue separation bitmap.

In addition to generating the first and second monochromatic output images 34, 36, the controller can generate additional output images 38, etc. based on some or all of the various other combinations of RGB color separations. Some additional combinations of the color separations include R−G; (R+G)/2−B; (R+B)/2−G; (G+B)/2−R; etc. The contrast between the dot patterns and the document substrate and photocopied color image, should be large enough in one or more of the plurality of output images to permit accurate identification of the photocopier-specific information.

It is contemplated that the controller can automatically generate any number of different output images 34, 36, 38, etc. from different combinations of the color separations. A user of the system 20 can selectively display and/or print individual monochromatic output images to determine on which output image the dot patterns are most visible. Alternatively, all of the output images that are generated can be automatically or selectively printed and/or displayed for inspection.

It should be appreciated that the method for detecting copier tracking signatures of the present invention can also be used to authenticate documents produced by color photocopiers. In particular, an input document can be authenticated by analyzing the dot patterns on the input document in the same manner as described above.

The invention has been described with reference to the preferred embodiment(s). Obviously, modifications and alterations will occur to others upon reading and understanding the preceding detailed description. It is intended that the invention be construed as including all such modifications and alterations insofar as they come within the scope of the appended claims or the equivalents thereof.

For instance, the method for detecting copier tracking signatures of the present invention can be implemented in hardware, software, firmware, or any combination thereof. Further, any number of hardware buffers or software buffers may be used to accomplish the method of detecting copier tracking signatures of the present invention.

Further, it is contemplated that any number of different difference combinations between the various color separations can be utilized to detect the dot patterns.

What is claimed is:

1. A method of detecting latent information present in an input document, comprising:
   generating at least first and second color separations that digitally represent respective first and second monochromatic components of the input document, wherein each of the first and second color separations are defined by a plurality of pixel values;
   determining color differences between corresponding pixels in the first and second color separations to provide determined color differences;
   combining the determined color differences into a resulting output image;
   enhancing the determined color differences to increase the contrast of the determined color differences, thus enabling the latent information to be detected in the resulting output image; and
   outputting data representative of the output image so as to provide the latent information.

2. The method of claim 1, further comprising the steps of:
   parsing the first and second color separations on a pixel-by-pixel basis; and
   performing a mathematical operation on the corresponding pixels in the first and second color separations to generate the output image.

3. The method of claim 2, further comprising the step of calculating the differences between pixel values of respective corresponding pixels in the first and second color separations.

4. The method of claim 3, further comprising the step of subtracting the pixel values of the first separation from the pixel values of the second separation on a pixel-by-pixel basis.

5. The method of claim 1, wherein the step of generating at least first and second color separations further comprises generating first, second, and third color separations respectively in the form of red, green, and blue separations.

6. The method of claim 5, wherein the step of combining the determined color differences is performed for corresponding pixels in the red, green, and blue separations, according to at least one of the following combinations: R−G; (R+G)/2−B; (R+B)/2−G; and (G+B)/2−R; wherein R, G, and B represent pixel values in the red, green, and blue color separations, respectively.

7. The method of claim 5, wherein the latent information is encoded as a pattern of yellow pixels, and wherein the step of determining color differences further comprises the step of determining differences between corresponding pixel values of the blue color separation and the green color separation.

8. The method of claim 1, further comprising the step of expanding a scale around a grouping of pixel values to provide difference values within a predefined range.

9. The method of claim 8, wherein the step of enhancing the determined color differences further comprises the step of discarding one or more pixel values that are outside of a predetermined range of values.

10. The method of claim 9, wherein the step of increasing the contrast of the determined color differences further comprises the step of application of a histogram-based technique.

11. The method of claim 1, wherein the step of combining the determined color differences further comprises the step of generating an output image for each of a plurality of differing combinations of determined color differences between the first and second color separations.

12. The method of claim 1, wherein the step of outputting data representative of the output image further comprises the step of providing the latent information in a visually recognizable form.

13. The method of claim 12, wherein the step of providing the latent information in a visually recognizable form further comprises at least one of the following steps:
   displaying the output image; and
   printing the output image.

14. The method of claim 1, wherein the step of outputting data representative of the output image further comprises the step of providing the outputted data to a storage device for subsequent detection of the latent information.

15. An image processing system for detecting latent information present in an input document, comprising:
   an input terminal for generating at least first and second color separations that digitally represent respective first and second monochromatic components of the input document, wherein each of the first and second color separations are defined by a plurality of pixel values;
   an image processing unit for determining color differences between corresponding pixels in the first and second color separations to provide determined color differences, combining the determined color differences into a resulting output image, and enhancing the determined color differences to increase the contrast of the determined color differences, thus enabling the latent information to be detected in the resulting output image; and
   an output terminal for outputting data representative of the output image so as to enable detection of the latent information.

16. The apparatus of claim 15, wherein the image processing unit parses the first and second color separations on a pixel-by-pixel basis and performs a mathematical operation on the corresponding pixels in the first and second color separations to generate the output image.

17. The apparatus of claim 16, wherein the image processing unit calculates the differences between pixel values of respective corresponding pixels in the first and second color separations.

18. The apparatus of claim 17, wherein the image processing unit subtracts the pixel values of the first separation from the pixel values of the second separation on a pixel-by-pixel basis.

19. The apparatus of claim 15, wherein the image processing unit generates first, second and third color separations respectively in the form of red, green, and blue separations.

20. The apparatus of claim 15, wherein the image processing unit determines color differences for corresponding pixels in the red, green, and blue separations, according to at least one of the following combinations: R−G; (R+G)/2−B; (R+B)/2−G; and (G+B)/2−R; wherein R, G, and B represent pixel values in the red, green, and blue color separations, respectively.

21. The apparatus of claim 15, wherein the latent information is encoded as a pattern of yellow pixels, and wherein the image processing unit determines differences between corresponding pixel values of the blue color separation and the green color separation.

22. The apparatus of claim 15, wherein the image processing unit expands a scale around a grouping of pixel values to provide difference values within a predefined range.

23. The apparatus of claim 22, wherein the image processing unit enhances the determined color differences by discarding one or more pixel values that are outside of a predetermined range of values.

24. The apparatus of claim 15, wherein the image processing unit increases the contrast of the determined color differences by application of a histogram-based technique.

25. The apparatus of claim 15, wherein the image processing unit combines the determined color differences by generating an output image for each of a plurality of differing combinations of determined color differences between the first and second color separations.

26. The apparatus of claim 15, wherein the output terminal provides the latent information in a visually recognizable form.

27. The apparatus of claim 15, wherein the output terminal includes at least one of a display for displaying the output image, and a printer for printing the output image.

28. The apparatus of claim 15, wherein the output terminal includes a storage device for receiving the outputted data and for subsequent detection of the latent information.

* * * * *